United States Patent
Chliwnyj et al.

(10) Patent No.: US 6,525,898 B1
(45) Date of Patent: Feb. 25, 2003

(54) DETECTION OF INDEXED SERVO POSITIONS DISPLACED FROM SERVO TRACK EDGES

(75) Inventors: Alex Chliwnyj, Tucson, AZ (US); John James Gniewek, Tucson, AZ (US); Robert Allen Hutchins, Tucson, AZ (US); Steven Carter Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,327

(22) Filed: Oct. 7, 1999

Related U.S. Application Data

(63) Continuation-in-part of application No. 09/365,898, filed on Aug. 3, 1999.

(51) Int. Cl.[7] .............................................. G11B 5/584
(52) U.S. Cl. .................................................. 360/77.12
(58) Field of Search ........................... 360/77.12, 78.05

(56) References Cited

U.S. PATENT DOCUMENTS

| | | | |
|---|---|---|---|
| 5,452,152 A | 9/1995 | Rudi | 360/77.12 |
| 5,523,904 A | 6/1996 | Saliba | 360/77.12 |
| 5,574,602 A | 11/1996 | Baca et al. | 360/77.12 |
| 5,629,813 A | 5/1997 | Baca et al. | 360/77.12 |
| 5,689,384 A | 11/1997 | Albrecht et al. | 360/77.12 |
| 5,711,064 A | 1/1998 | Husky et al. | 29/603.06 |
| 5,872,672 A | 2/1999 | Chliwnyj et al. | 360/77.12 |

*Primary Examiner*—David Hudspeth
*Assistant Examiner*—K. Wong
(74) *Attorney, Agent, or Firm*—John H. Holcombe; Jean M. Barkley

(57) ABSTRACT

A servo position detector and a method for detecting and following an index position displaced at an offset with respect to an edge of a servo track, an edge comprising an interface between two dissimilar recorded servo signals. The servo track has two edges on opposite lateral sides of a middle recorded servo signal, the edges separated by a predetermined distance. A servo read element has an active sensing region which is no more than and is substantially the entire predetermined distance separating the edges, thereby sensing no more than two of the dissimilar recorded servo signals at one of the edges. An independent position sensor senses the coarse position of the servo read element, indicating which edge or which index position is aligned with the servo read element. Logic compares the two sensed servo signals to determine the ratio therebetween, and determines an error between the compared ratio and a predetermined ratio. The predetermined ratio is an offset from a centered on-edge ratio, and identifies the index position. The logic provides the servo position error with respect to the index position. A servo positioner moves the servo read element to reduce the servo position error.

30 Claims, 13 Drawing Sheets

DETECTION OF INDEXED SERVO POSITIONS DISPLACED FROM SERVO TRACK EDGES

CROSS-REFERENCE TO RELATED APPLICATION

This application is a continuation-in part of U.S. application No. 09-365,898, entitled "DECODING DIGITALLY SAMPLED SERVO TRACKS", which was filed in the United States Patent and Trademark Office on Aug. 13, 1999.

DOCUMENTS INCORPORATED BY REFERENCE

Commonly assigned U.S. Pat. No. 5,448,430 is incorporated for its showing of servo tracks employed for magnetic track following servo systems, and commonly assigned U.S. Pat. No. 5,844,814 is incorporated for its showing of an independent position sensor in a head positioning system.

FIELD OF THE INVENTION

This invention relates to the detection of prerecorded servo track positioning information, and, more particularly, to the detection and track following of servo track positioning information from servo tracks having at least two edges, each edge comprising an interface between two dissimilar recorded servo signals, as read by a servo read element, to allow positioning of the servo read element and the corresponding data head.

BACKGROUND OF THE INVENTION

In the data storage industry, advances in technology include increases in the data storage capacity of given data storage media. One means of increasing the data storage capacity of data storage media, such as magnetic tape cartridges or magnetic tape cassettes, is to increase the track density of the data storage media, and in a corresponding manner, to decrease the width of each track.

In a typical magnetic tape, data is recorded in a plurality of parallel, longitudinal data tracks. A data head may have a plurality of data heads which have fewer numbers of read/write elements than tracks. The data tracks are divided into groups, typically interleaved, and the data head is indexed laterally with respect to the tracks to access each group.of data tracks. In order to properly register the data head with the data tracks, prerecorded servo tracks are provided which are parallel to the data tracks. A servo read head located at an indexed position with respect to the read/write elements reads the servo tracks. The servo tracks provide lateral positioning information which, when read by the servo read head, can be decoded to indicate whether the servo read head is correctly positioned with respect to the servo tracks. Thus, the servo head can be moved laterally to a desired position with respect to the servo tracks so as to properly register the read/write elements with respect to a desired group of data tracks. Then, the servo head can follow the servo tracks as the media and the head are moved longitudinally with respect to each other, so that the read/write elements maintain registration with the data tracks.

As an example, the prerecorded servo track positioning information comprises adjoining servo tracks having different servo patterns, one of the servo patterns comprising a constant amplitude signal of a single first frequency, and the other servo pattern alternating between a constant amplitude burst signal of a single second frequency and a zero amplitude null signal. The interface between the adjoining servo signals is called an "edge". The resultant signal read by the servo head is a maximum signal comprising the first frequency signal combined with the second frequency burst signal and a minimum signal comprising the first frequency signal combined with the null signal. If the servo head is correctly positioned at the junction of the adjoining servo tracks, the amplitude of the combined first and second frequency signals is twice the amplitude of the combined first and null signals, and is easily decoded. Coassigned U.S. Pat. No. 5,448,430 illustrates the above discussed servo track patterns and describes a track following servo positioning system employing peak detection to determine the maximum and minimum signals.

As data capacity is increased, it is also desirable to have backward compatibility to data storage media having the prior level of data capacity, to avoid the necessity of copying all of the data recorded on the prior media onto the new media.

SUMMARY OF THE INVENTION

It is therefore an object of the present invention to increase the track density of a data storage media, while utilizing the prior media servo tracks, so that the servo system may be operated to utilize the servo track positioning information as before for the prior media, and to utilize the same servo track positioning information in a more precise manner to access tracks at a higher track density.

A servo position detector and a method for detecting servo positioning with respect to an index position displaced at an offset with respect to a servo track are provided. The servo track has at least two edges, each edge comprising an interface between two dissimilar recorded servo signals. The edges are on opposite lateral sides of a middle recorded servo signal, and the edges are separated by a predetermined distance.

The sensor comprises a servo read element having an active sensing region which is no more than and is substantially the entire predetermined distance separating the edges. Thus, the servo read element thereby senses no more than two of the dissimilar recorded servo signals and at one of the edges. Logic coupled to the servo read element compares the two sensed servo signals to determine the ratio therebetween, and determines an error between the compared ratio of the sensed servo signals and a predetermined ratio. The predetermined ratio comprises a predetermined offset from the centered on-edge ratio of amplitudes in a predetermined direction, and identifies the index position. The index position is substantially parallel to the edge and displaced from the edge.

The logic provides an output signal related to the determined error, the output signal identifying the servo position error with respect to the index position.

In further embodiments of the invention, a servo track follower and method are provided for detecting and following the servo index position related to the servo track. A servo positioner is coupled to the logic and moves the servo read element in a direction to reduce the servo position error.

In another embodiment of the invention, the displacement of the index position from one of the edges is substantially 1/4 of the predetermined distance separating the edges, for a total of four index positions, one on each side of an edge. Another embodiment employs the edges as in the prior art and additionally has index positions displaced substantially 1/3 of the predetermined distance separating the edges, for a total of six index positions. The servo read element active sensing region distance comprises between substantially 80% and substantially 100% of the predetermined distance separating the edges.

In still another embodiment of the invention, for detecting the servo positioning with respect to a plurality of parallel spaced servo tracks, a plurality of the servo read elements are spaced apart to sense the two dissimilar signals at each corresponding edge of the servo tracks. The logic additionally averages the corresponding sensed two dissimilar signals of each of the plurality of read elements and determines an error between the compared ratio of the averaged dissimilar servo signals and the predetermined ratio.

In a further embodiment of the invention, an independent position sensor is additionally provided for sensing the coarse position of the servo read element with respect to a reference, the coarse position indicating which of the edges of the servo track is aligned with and detected by the servo read element. The logic additionally employs the coarse position to identify the predetermined index position and to select the predetermined ratio.

An input receives the input signal, and logic is coupled to the input. The logic responds to the received input signal to determine the identified index position, selecting the edge and a predetermined ratio representing the input indicated predetermined index position, the predetermined ratio comprising a predetermined offset from the centered on-edge ratio in a predetermined direction. A servo read element having an active sensing region extends substantially orthogonal to the one of the edges to sense no more than two of the dissimilar recorded servo signals at one of the edges. An independent position sensor senses the present coarse position of the servo read element with respect to a reference, the present coarse position indicating the present one of the predetermined index positions of the servo track that is aligned with and detected by the servo read element. The logic is coupled to the independent position sensor and to the servo read element. The logic responds to the present coarse position to indicate the present index position detected by the servo read element. The logic responds to the present index position and to the input identified index position, first operating a positioning servo in a direction from the present index position toward the input identified index position, thereby selecting the input identified one of the predetermined index positions. The logic then compares the two sensed servo signals to determine a ratio therebetween, and determines an error between the ratio of the compared sensed servo signals and the selected predetermined ratio of the selected one of the predetermined index positions, thereby determining a servo position error with respect to that index position. The logic provides a position error output to the positioning servo to operate the positioning servo in a direction to reduce said servo position error, thereby track following the selected predetermined index position.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
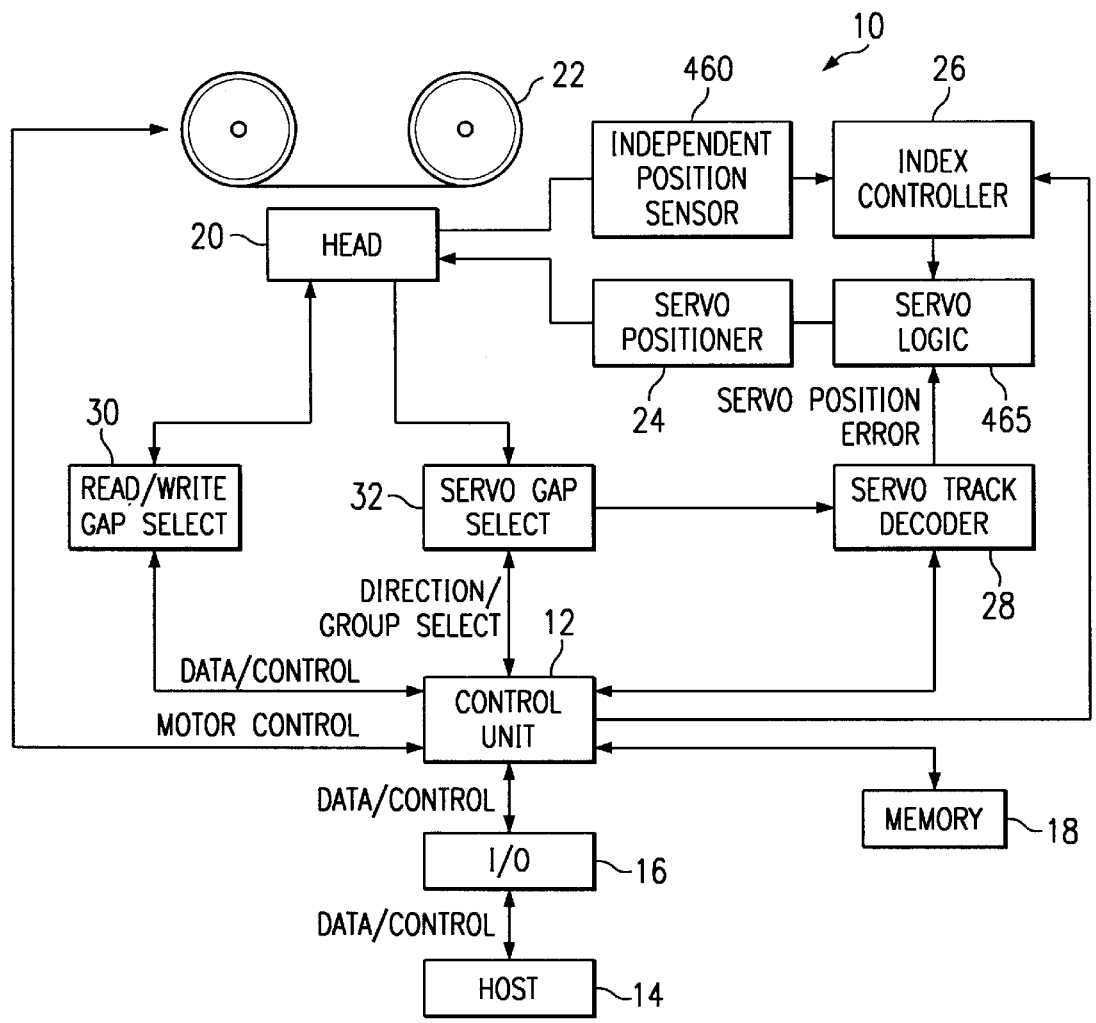
FIG. 1 is a block diagram of a magnetic tape system employing the present invention.
Figure 2:
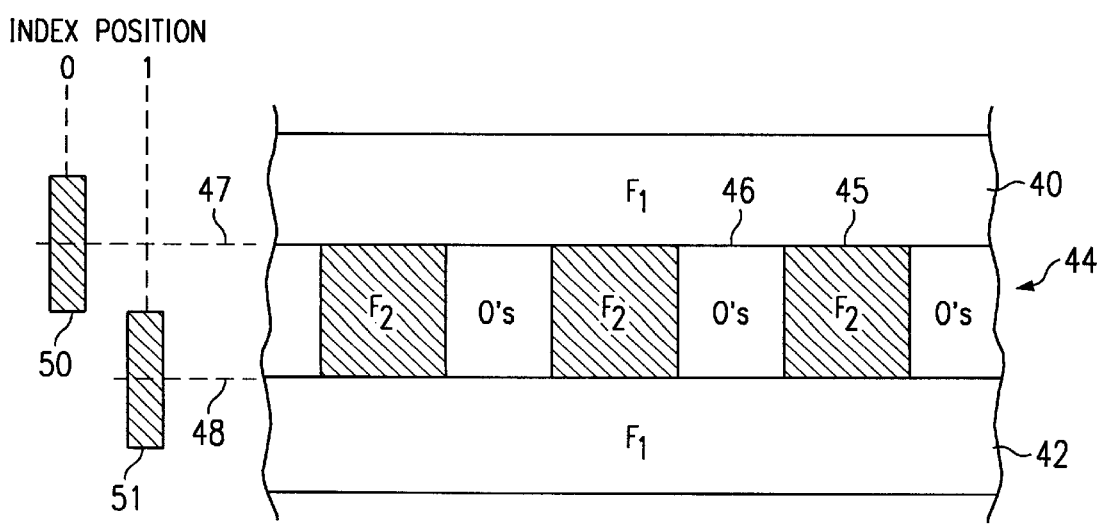
FIG. 2 is a diagrammatic illustration of a magnetic tape format of two servo index positions in a combined servo track.

Referring to FIG. 1, a data storage system 10, such as a magnetic tape system, is illustrated. An example of a magnetic tape system in which the servo track positioning system of the present invention may be employed is the IBM 3590 magnetic tape subsystem. A control unit 12 is provided to and from which data and control signals are transmitted from and to a host device 14 through an interface 16. The control unit 12 is coupled to a memory device 18, such a random access memory for storing information, such as predetermined values for changing or programming various values. An example of a control unit 12 comprises an IBM RS/6000 processor. A multi-element magnetic tape head 20, such as is well known in the art, includes a plurality of data read/write elements to record and read data onto and from a magnetic tape 22, and servo read elements to read servo signals comprising prerecorded servo track positioning information in a plurality of servo tracks on the tape 22.

A tape reel motor system (not shown) of the tape drive moves the tape 22 in the longitudinal direction, and a servo positioner 24 directs the motion of the head 20 in a lateral or transverse direction relative to the longitudinal direction of tape motion. The control unit 12 is coupled to the tape reel motors and controls the direction, velocity and acceleration of the tape 22 in the longitudinal direction.

The data tracks on the tape 22 are arranged in parallel and in parallel to the servo tracks. Thus, as the servo positioner 24 causes a servo read element to track follow a servo track, the data read/write elements track a parallel group of the data tracks. If it is desired to track another parallel group of data tracks, the head 20 is indexed laterally so that the same servo read element is aligned with another servo track, or a different servo read element is aligned with the same or a different servo track.

When the head 20 is to be moved to a selected index position, an index controller 26 is enabled by the control unit 12, receiving a coarse position signal from an independent position sensor 460 and transmits an appropriate signal to servo logic 465 to select the appropriate servo track, while the control unit 12 transmits an appropriate signal to a servo gap selector 32 to select the appropriate servo read element. The independent position sensor 460 is discussed in the incorporated U.S. Pat. No. 5,844,814, and indicates the position of the head with respect to a fixed reference. The logic 465 operates the servo positioner 24 in accordance with the present invention to position the servo read element at the correct servo track and track follow the track, as will be explained. The logic 465 may comprise a programmed PROM, ASIC or microprocessor. The tape system 10 may be bi-directional, in which ones of the read/write elements are selected for one direction of movement, and others of the read/write elements are selected for the opposite direction of movement. The control unit 12 additionally selects the appropriate ones of the read/write elements by transmitting a signal to a read/write gap select unit 30. In accordance with the present invention, servo track decoder 28 decodes the servo information and servo logic 465 determines the positioning error information and provides the positioning information to the servo positioner 24 to align the selected servo read element to the selected servo track.

Figure 19:
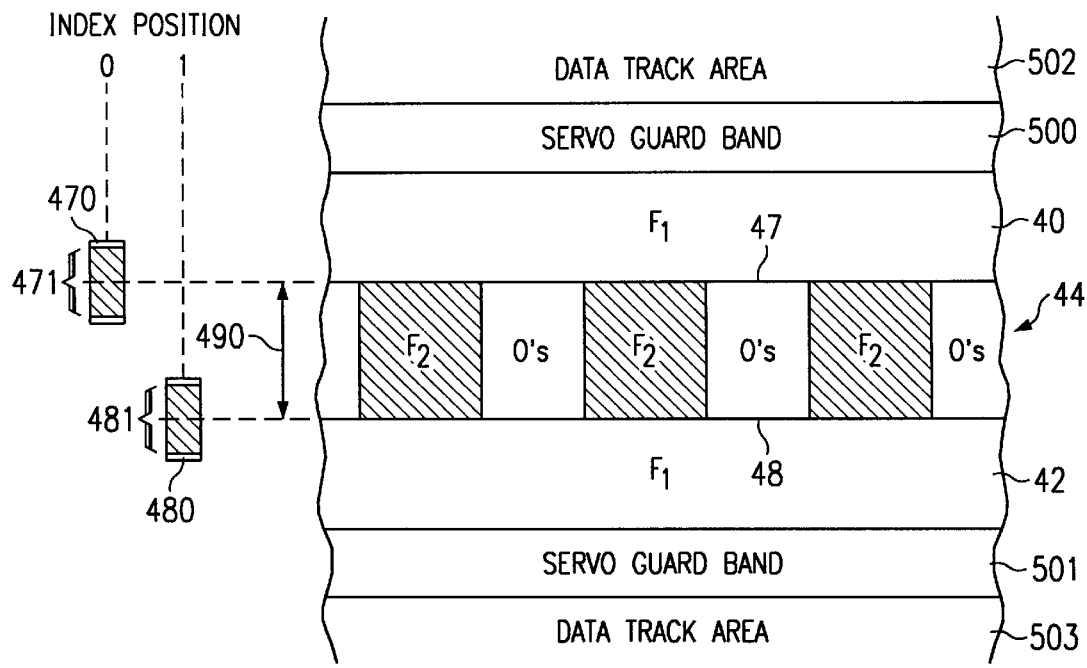
FIG. 19 is a diagrammatic illustration of a magnetic tape format of two servo positions of a two-edged servo track and a prior art servo read element.

FIG. 19 illustrates a prior art magnetic tape format of two adjoining servo signals 47 and 48, called "edges", in a combined servo track, together with prior art servo read elements 470 and 480 having active sensing regions 471 and 481. The combined prerecorded servo track comprises two dissimilar servo signals, one servo signal at outer tracks 40 and 42, having a recorded pattern of a constant amplitude signal of a single first frequency, on either side of a middle track 44 of the other servo signal, having a recorded pattern alternating between a constant amplitude burst signal 45 of a single second frequency and a zero amplitude null signal 46.

Two servo edges 47 and 48 are represented. An "edge" comprises an interface between the two dissimilar servo signals. When a servo read element is centered on servo edge 47 or on servo edge 48, the resultant signal read by the servo element is a maximum signal comprising the first frequency signal combined with the second frequency burst signal, alternating with a minimum signal comprising the first frequency signal combined with the null signal. If the servo head is correctly centered on the edge of the adjoining servo tracks, this is called the "centered on-edge ratio", and the amplitude of the combined first and second frequency signals is twice the amplitude of the combined first and null signals. This amplitude ratio is called the 1/2 ratio. Incorporated U.S. Pat. No. 5,448,430 illustrates the above discussed servo track patterns and describes a track following servo positioning system employing peak detection to determine the maximum and minimum signals.

Typically, the combined servo track 40–44 is provided with servo guard bands 500 and 501 to protect the outer tracks 40 and 42 from noise resulting from the data track areas 502 and 503. The prior art servo read elements 470 and 480 have the smallest possible active sensing regions 471 and 481 to increase the signal to noise ratio for peak detection.

The prior art servo track edges 47 and 48 are separated by a predetermined distance 490, employed for manufacturing of the magnetic tape and servo tracks. Thus, only two index positions are allowed, each centered on one of the edges 47 and 48. The data track density is increased by providing additional servo read elements at shifted positions, so that the other read elements may be indexed to the index positions. The capability is limited by the manufacturability of precisely shifted servo read elements.

As discussed above, it is desirable to provide additional data tracks. The traditional approach is to provide more precise positioning of the servo head by providing servo (and data) tracks that are smaller and positioned closer together. However, it becomes difficult to use the same servo read elements to provide backward compatibility to data storage media having the prior level of data capacity, to avoid the necessity of copying all of the data recorded on the prior media onto the new media.

Figure 20:
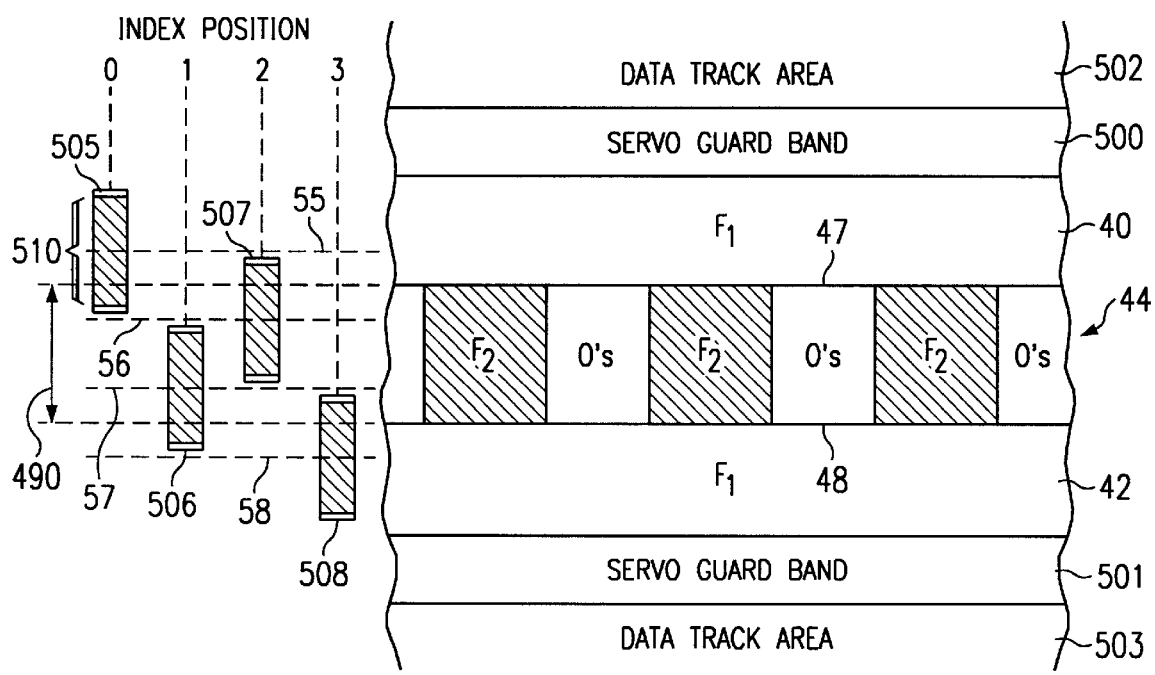
FIG. 20 is a detailed diagrammatic illustration of a magnetic tape servo track employed with servo read elements in accordance with the present invention for providing the four servo index positions of FIG. 3.

Hence, in accordance with the present invention, as illustrated in FIG. 20, the servo tracks are unchanged, but the data tracks are positioned in a more dense arrangement.

Specifically, the combined prerecorded servo track comprises the prior art two outer tracks 40 and 42, having a recorded pattern of a constant amplitude signal of a single first frequency, on either side of the middle track 44, which alternates between a constant amplitude burst signal and a zero amplitude null signal to provide the two servo edges 47 and 48. The edges 47 and 48 are separated by the predetermined distance 490. Now, however, the data tracks are aligned so that a servo element is displaced from an.edge 47 or 48 so as to provide a higher track density. For example, the displaced alignment may be located along lines 55–58 about one quarter the width of the middle track 44 away from the servo edge centerline in either direction, providing four index positions. In order to center the data read/write elements in the "0" and "3" index positions, the servo read element must be located at position 505 or at position 508, and will read a minimum signal that has an amplitude of about 3/4 of the maximum signal, and to center the data read/write elements in the "1" and "2" index positions, the servo read element must be located at position 506 or at position 507, and will read a minimum signal that is about 1/4 of the maximum signal.

Thus, a single servo element, rather than track following up to two servo edges 47 and. 48, now tracks four servo index positions 55–58, effectively doubling the data density for the existing servo tracks. Additionally, as in the prior art, indexed servo read elements may be employed, and the present invention will allow a doubling of the data track density.

Figure 23:
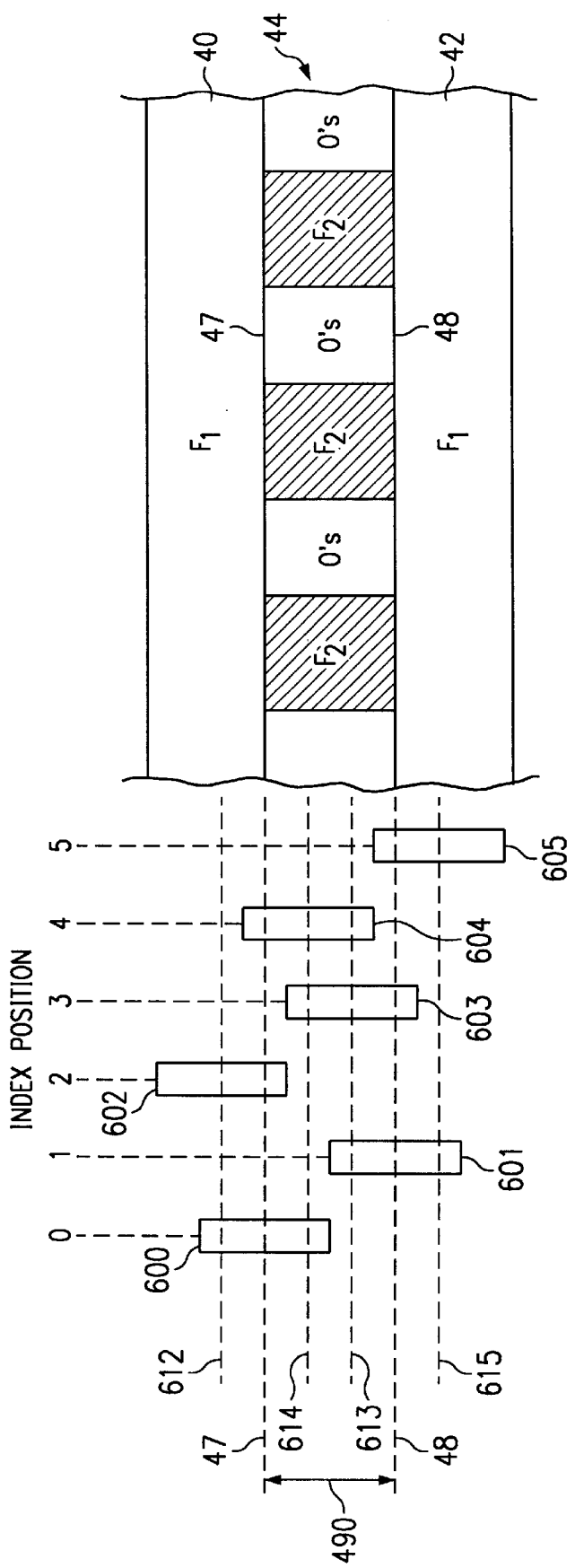
FIG. 23 is a detailed diagrammatic illustration of a magnetic tape servo track employed with servo read elements in accordance with the present invention for providing six servo index positions in the servo track of FIG. 2.

Another embodiment of the present invention is illustrated in FIG. 23. At the "0" or "1" index positions, the servo element is located at position 600 centered on servo edge 47 or at position 601 centered on servo edge 48. Additional index positions are provided which are aligned such that a servo element is displaced from an edge 47 or 48 located along lines 612–615 about 1/3 the width of the middle track 44 away from the servo edge 47 or 48 in either direction. As the result, the number of index positions becomes six.

In order to center the data read/write elements in the "2" and "5" index positions, the servo read element must be located at position 602 or at position 605, and will read a minimum signal that has an amplitude of about 5/6 of the maximum signal, and to center the data read/write elements in the "3" and "4" index positions, the servo read element must be located at position 603 or at position 604, and will read a minimum signal that has an amplitude of about 1/6 of the maximum signal.

Other displacements can be envisioned, including multiple index positions.on either side of an edge, requiring the detection of precise amplitude ratios. The specific amplitude ratios are functions of the distance covered by the active sensing region of the servo read head, etc.

Referring to FIG. 20, in accordance with the present invention, the active sensing region 510 of the servo read element extends over a distance substantially orthogonal to the edges, which is no more than and is substantially the entire predetermined distance 490. Thus, the servo read element active sensing region extends over a distance sufficient to sense both of the two dissimilar recorded servo signals at one edge, and senses no more than two of the dissimilar recorded servo signals.

Specifically, the sensing distance 510 is greater than twice the index position displacement and comprises between substantially 80% and substantially 100% of the predetermined distance separating the edges.

It is apparent that any significant noise will result in exaggeration of the minimum signal in position 506 or in position 507, and any noise will result in difficulty in distinguishing the maximum from the minimum signal in position 505 or in position 508. Hence, referring additionally to FIG. 1, the decoding of the servo signals is accomplished by the servo decoder 28 and method of the parent application as depicted in FIGS. 4–18.

Figure 4:
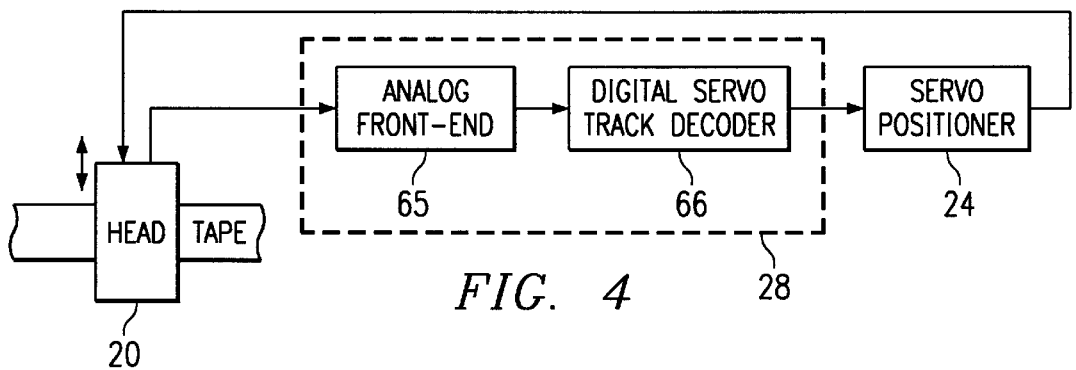
FIG. 4 is a block diagram illustrating a servo track positioning system for decoding asynchronous digital samples of prerecorded servo track positioning information from a tape of FIG. 1 and for positioning of read/write elements in accordance with the parent invention.

FIG. 4 illustrates a servo track positioning system in accordance with.the present invention for reading the analog servo signals at the servo element of head 20, having a servo track decoder 28 for converting the analog servo signals to asynchronous digital samples of the signal in analog front end 65 and a digital servo track decoder 66 to decode the digital samples and determine the amplitudes of the envelopes of the minimum and the maximum signals represented by the digital samples. The servo positioner 24 then positions the servo element of head 20 and thereby positions the read/write elements in accordance with the decoded positioning information. Thus, the servo track decoder 28 decodes the servo positioning information and provides the positioning information to the servo positioner 24 to align the selected servo read element to the selected index position so as to properly align the read/write elements at the desired data tracks.

Figure 5:
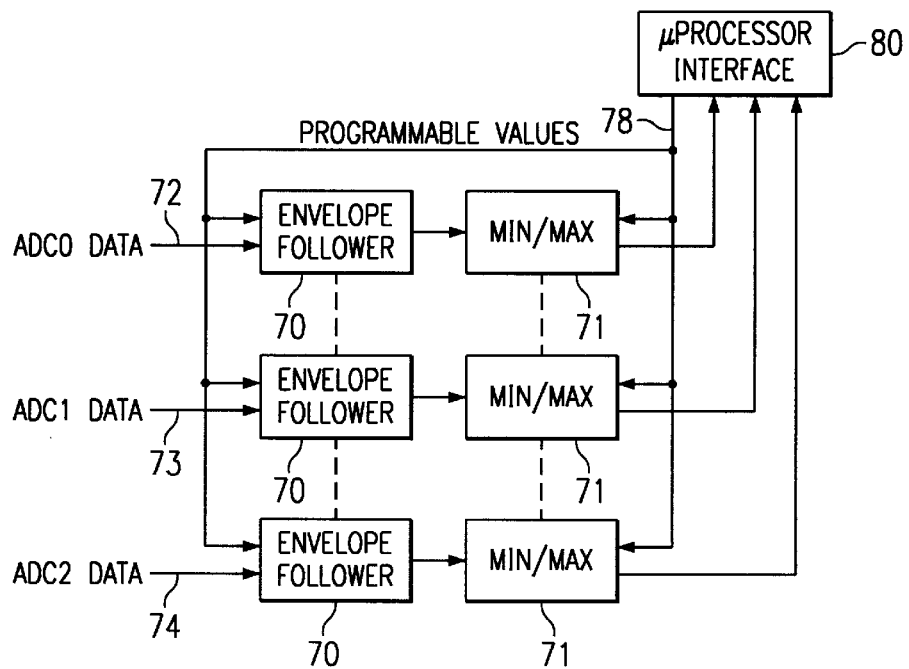
FIG. 5 is a block diagram of a plurality of the servo track decoders of FIG. 4 and an interface for supplying programmable values for the servo track decoders.

FIG. 5 illustrates a plurality of the digital servo track decoders of FIG. 4, each comprising an envelope follower 70 and a minimum/maximum detector 71. Each of the envelope followers 70 receives the asynchronous digital samples of a different servo element from an associated analog front end on a respective line 72–74.

In accordance with the parent invention, various media, such as magnetic tape having different magnetic characteristics (perhaps due.to differences in materials), or having different servo or data track densities (as discussed above), may be utilized by providing different programmable values on lines 78 for the servo track decoders, either by the control unit of FIG. 1, or by a separate microprocessor, at microprocessor interface 80. A switch 82 operates multiplexors 83 to provide the appropriate decoded positioning information to the servo positioner at output 84.

Figure 3:
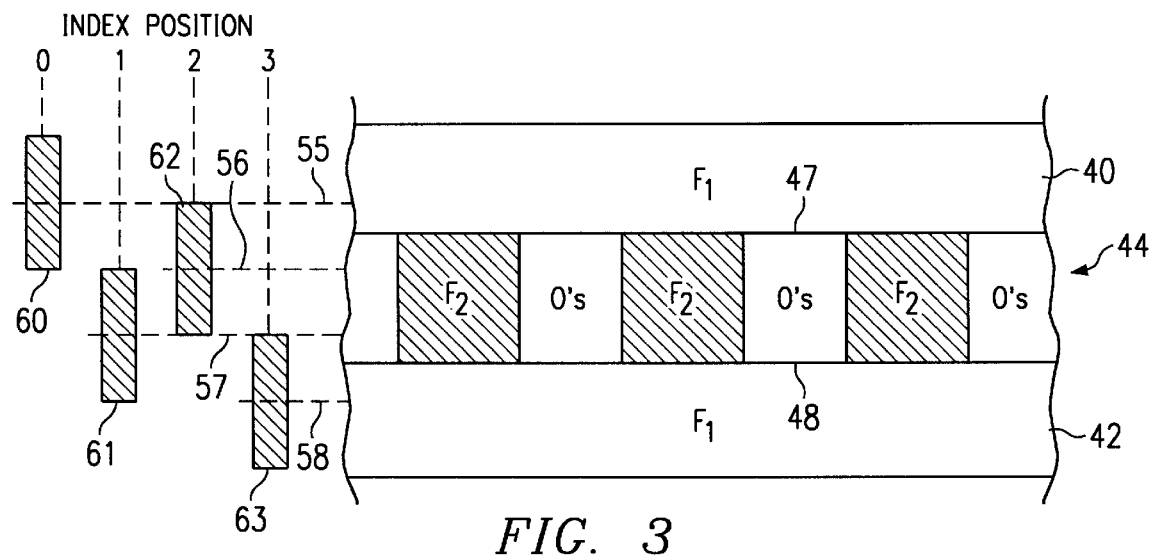
FIG. 3 is a diagrammatic illustration of a magnetic tape format employed in accordance with the present invention for providing four servo index positions in the servo track of FIG. 2.
Figure 6A:
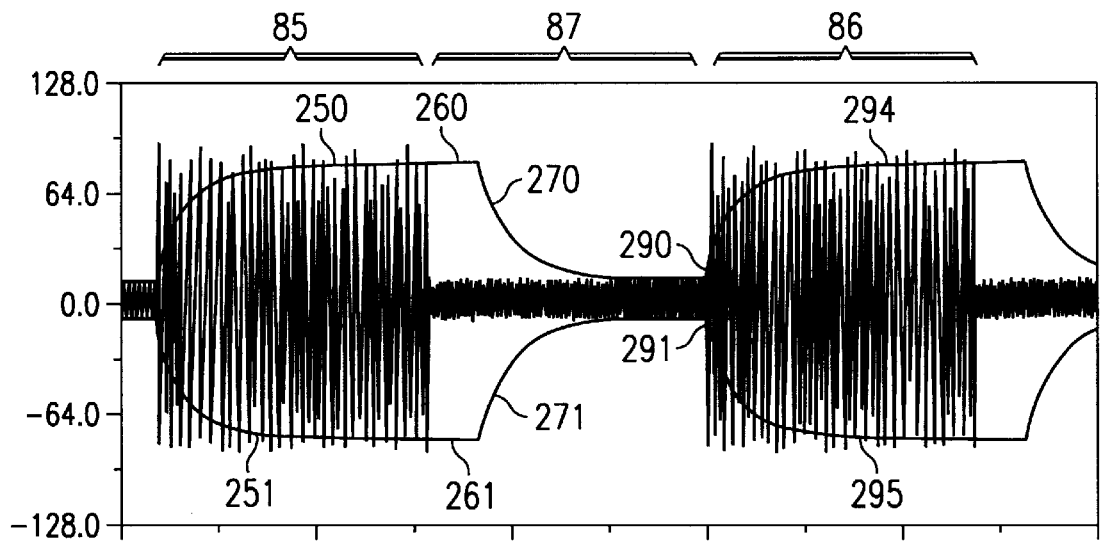
FIGS. 6A and 6B are illustrations of exemplary analog servo signals for different positions of a servo read head and examples of digital envelopes of the respective analog servo signals generated by a servo track decoder of FIGS. 4 and 5.
Figure 6B:
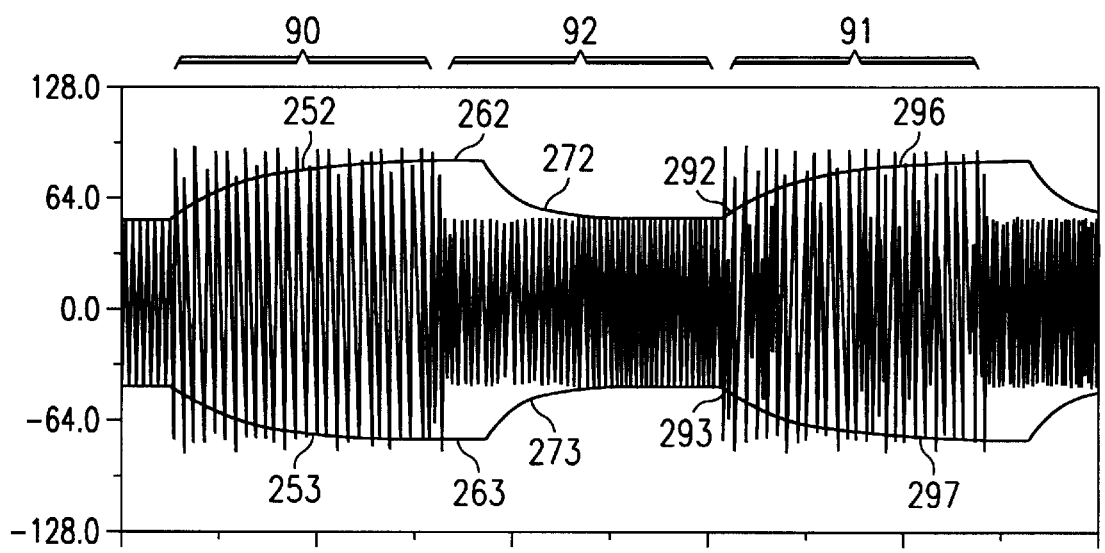
Figure 7:
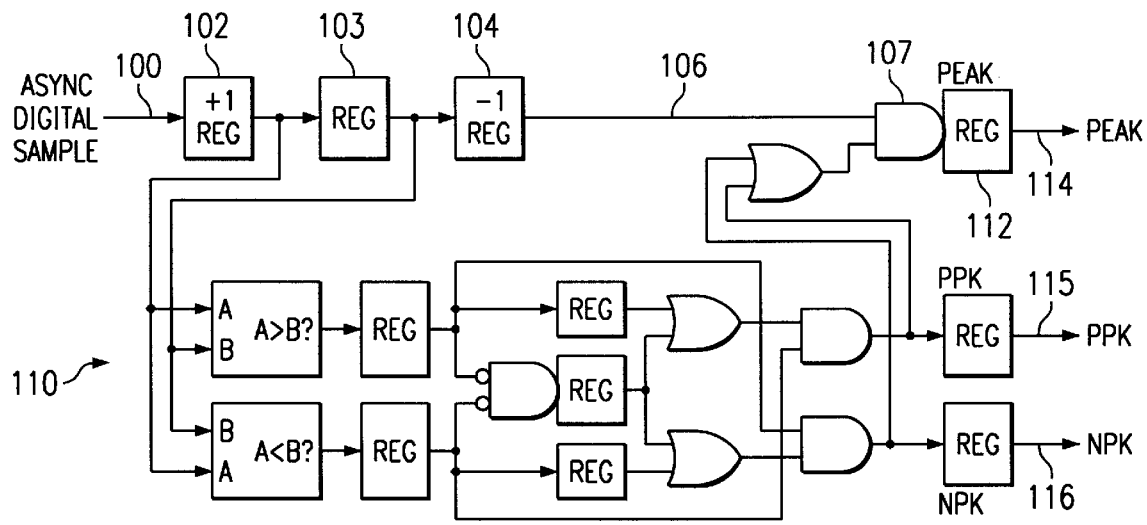
FIGS. 7–12 are block diagrams of an embodiment of the servo track decoder of the parent invention.
Figure 8:
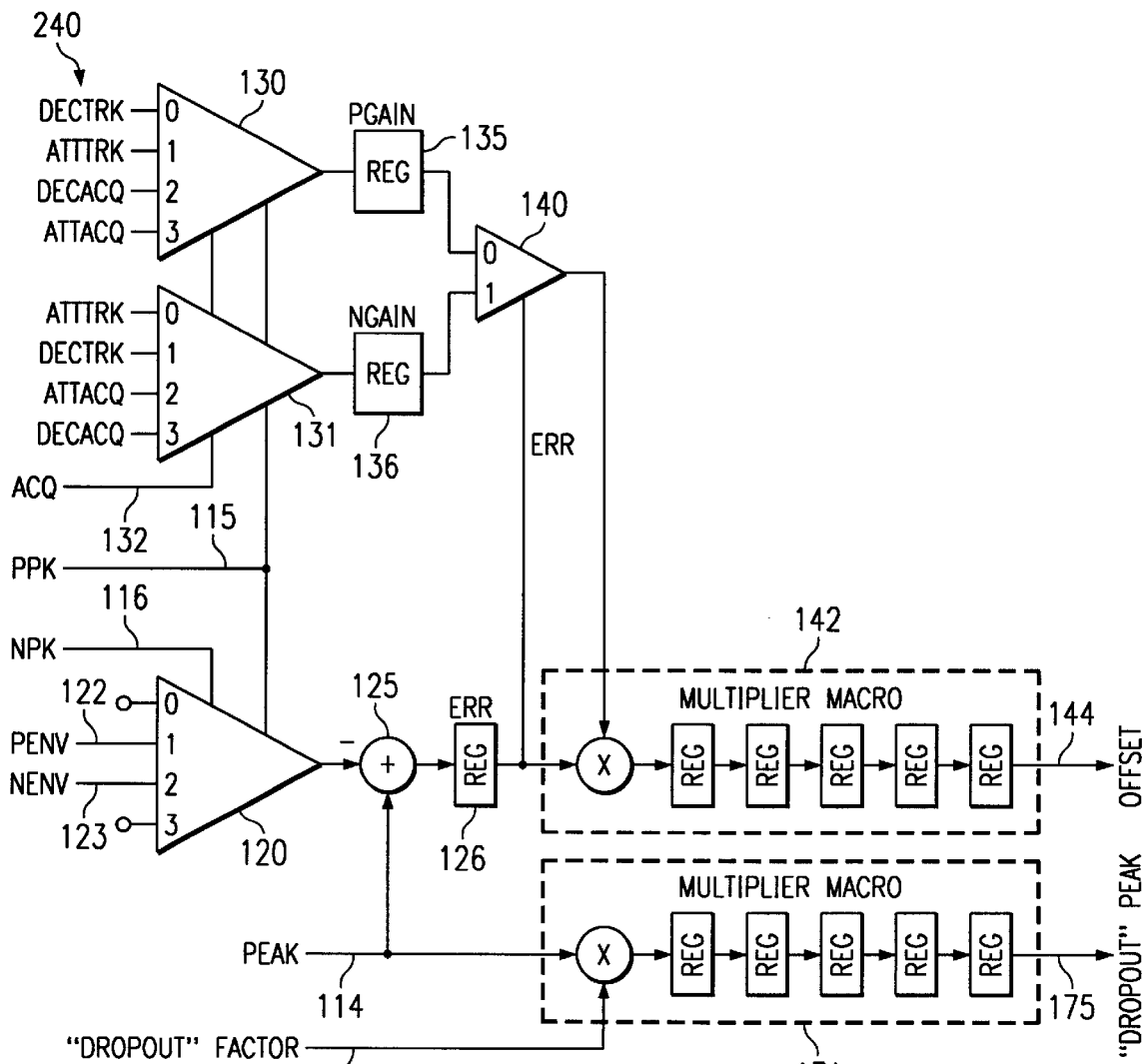
Figure 9:
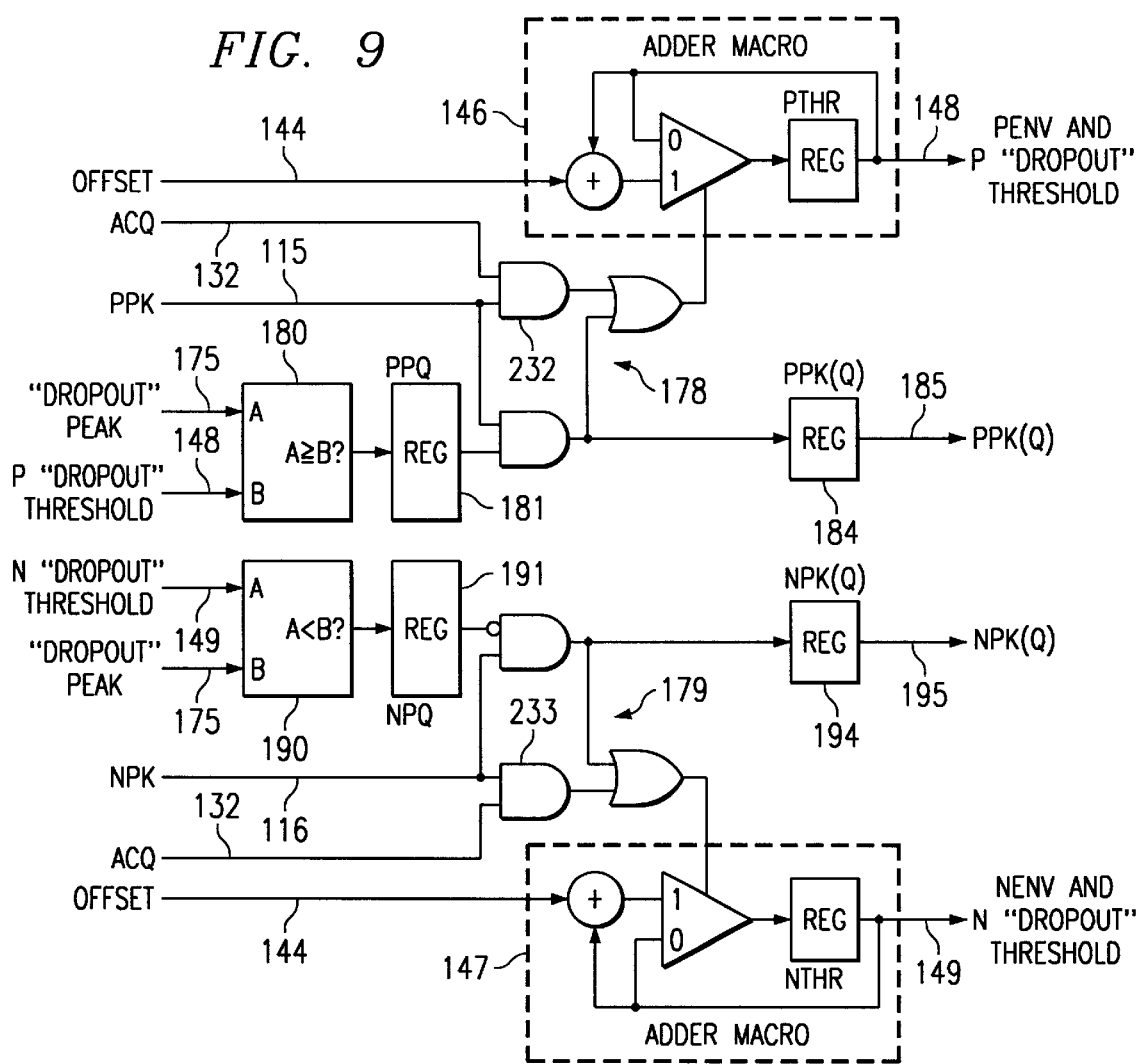
Figure 10:
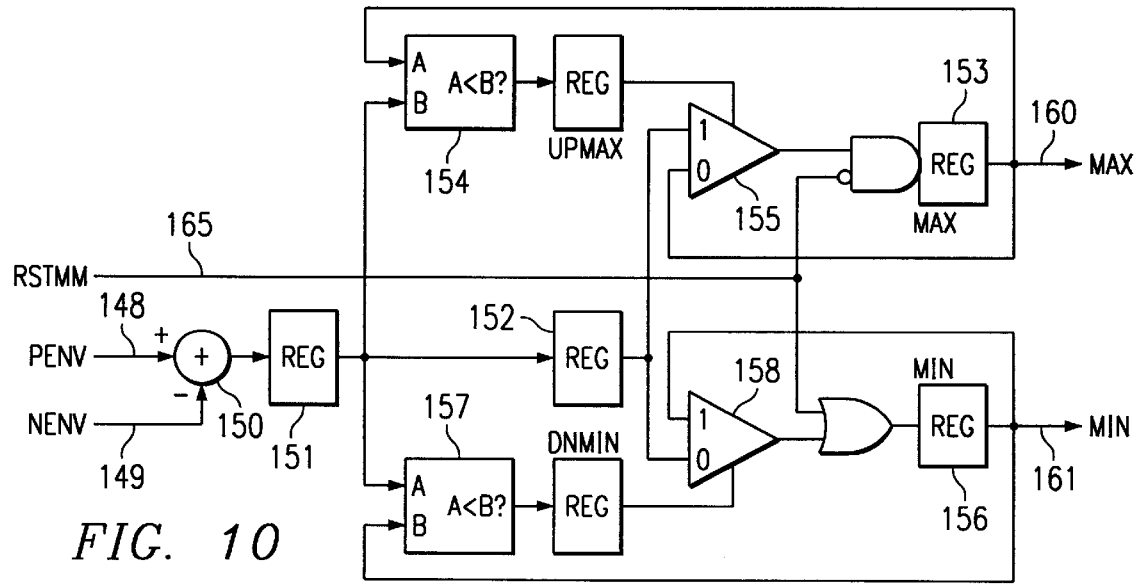
Figure 11:
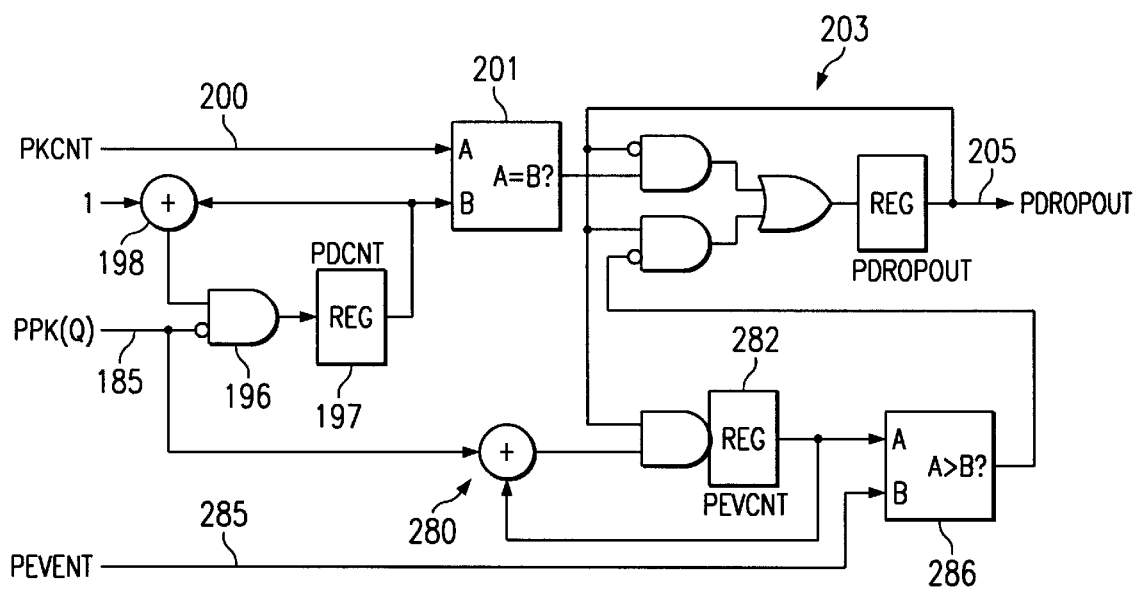
Figure 12:
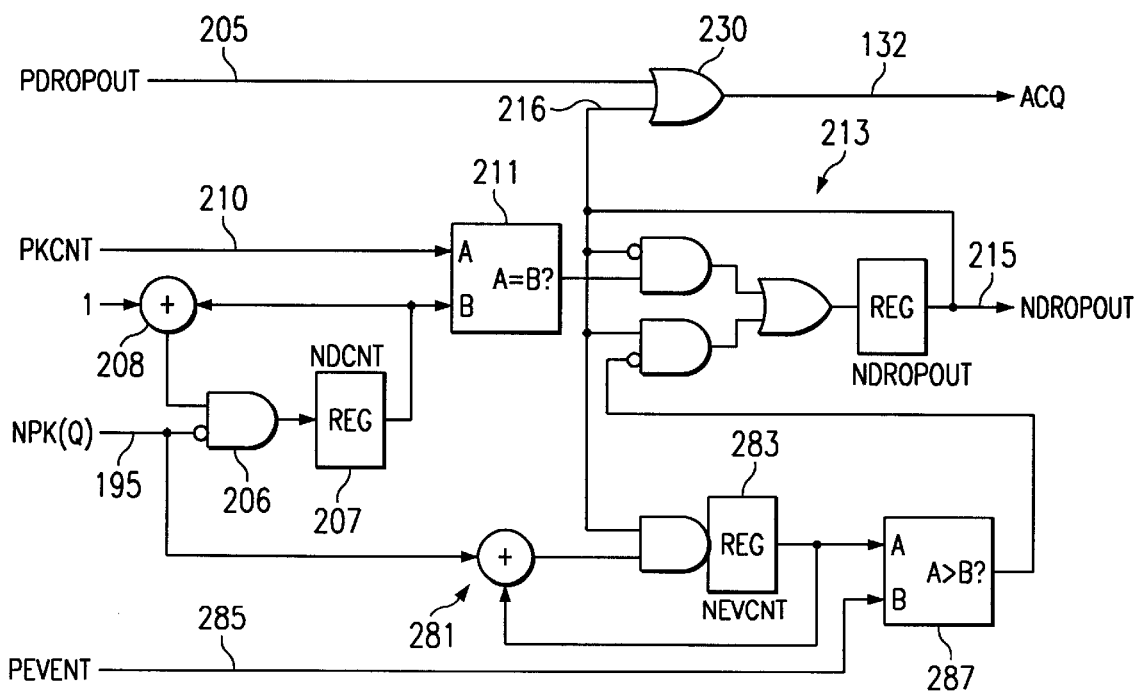
Figure 13:
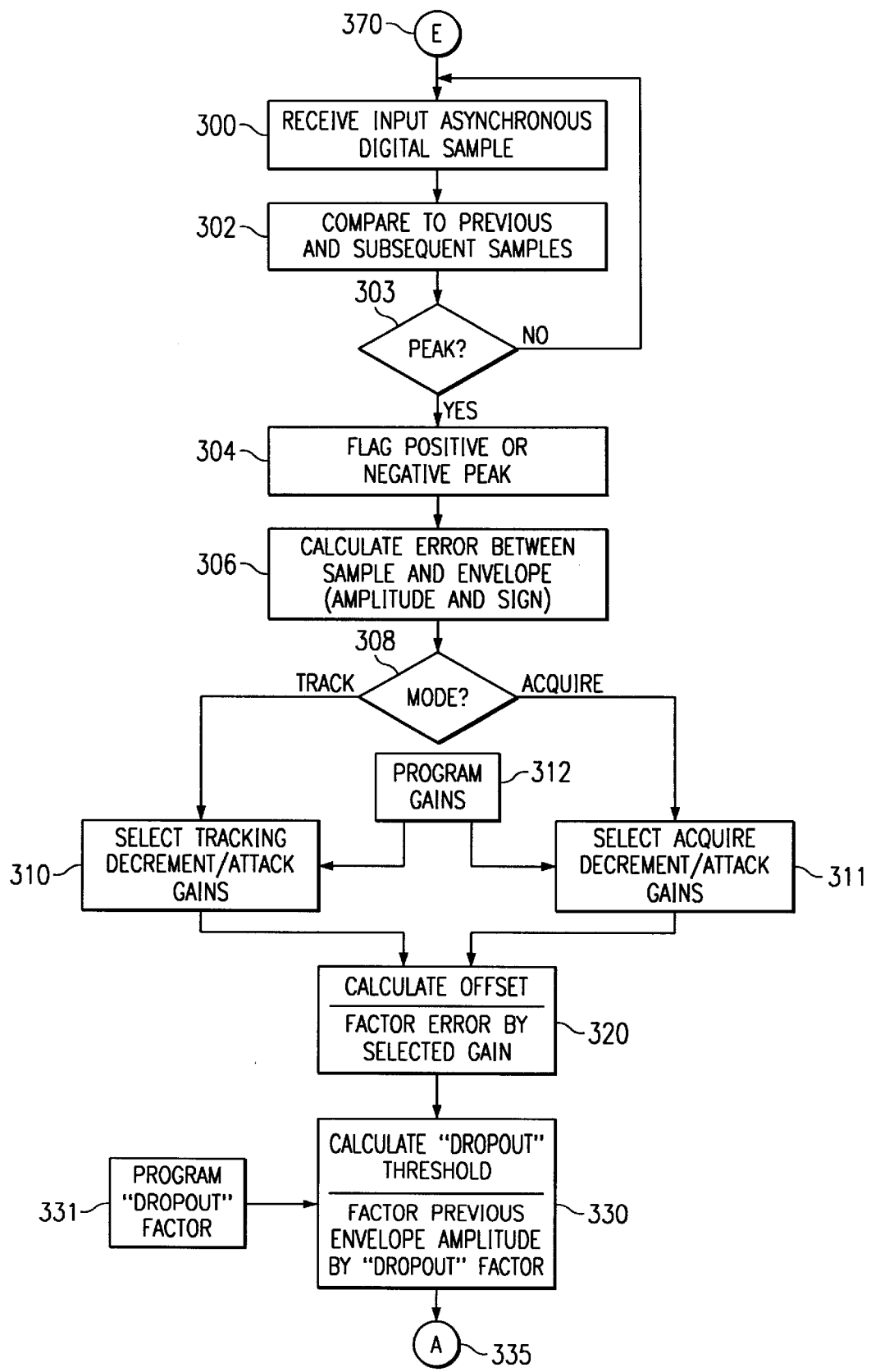
FIGS. 13–18 are flow charts depicting an embodiment of the method of the parent invention.
Figure 14:
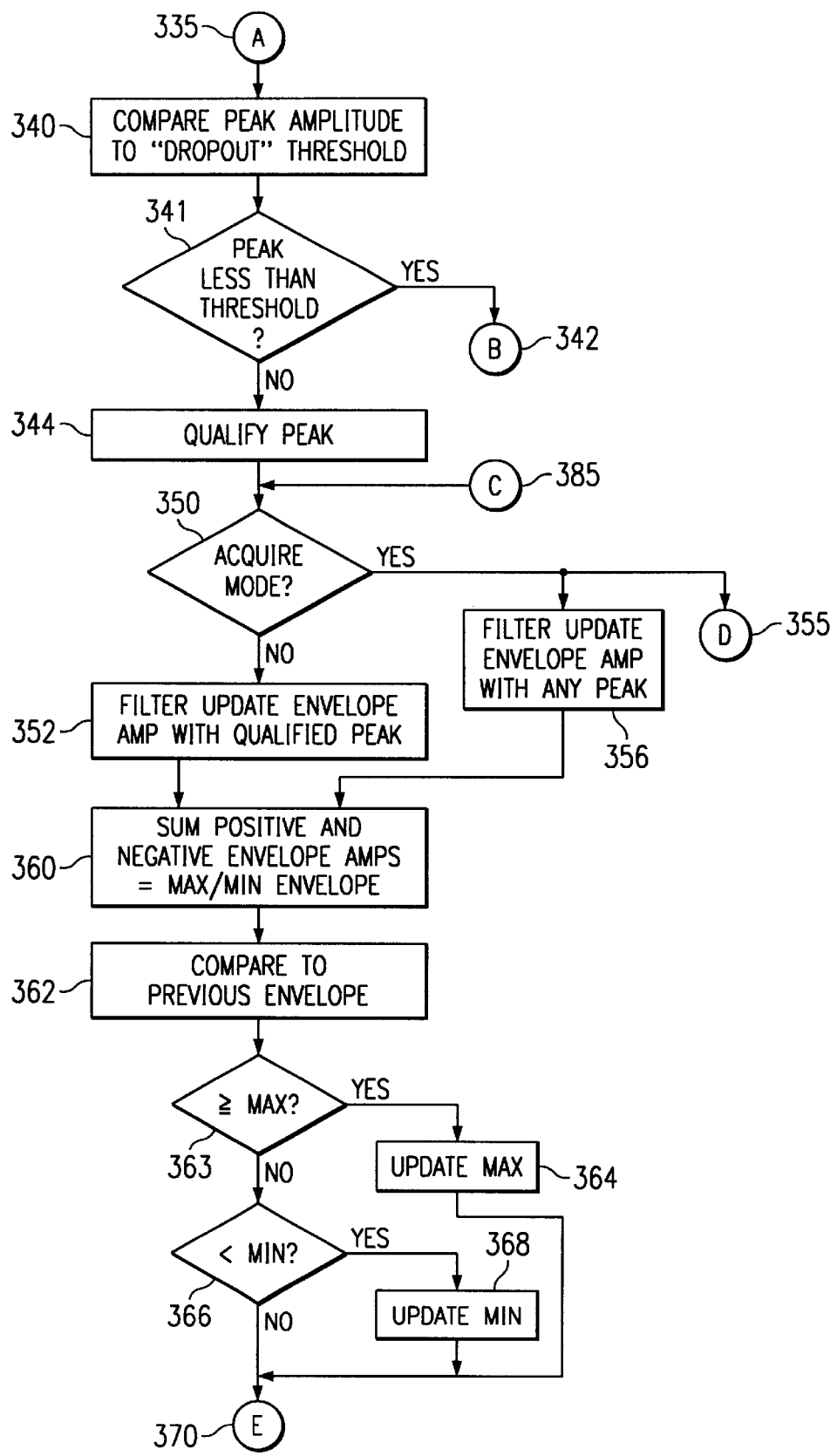
Figure 15:
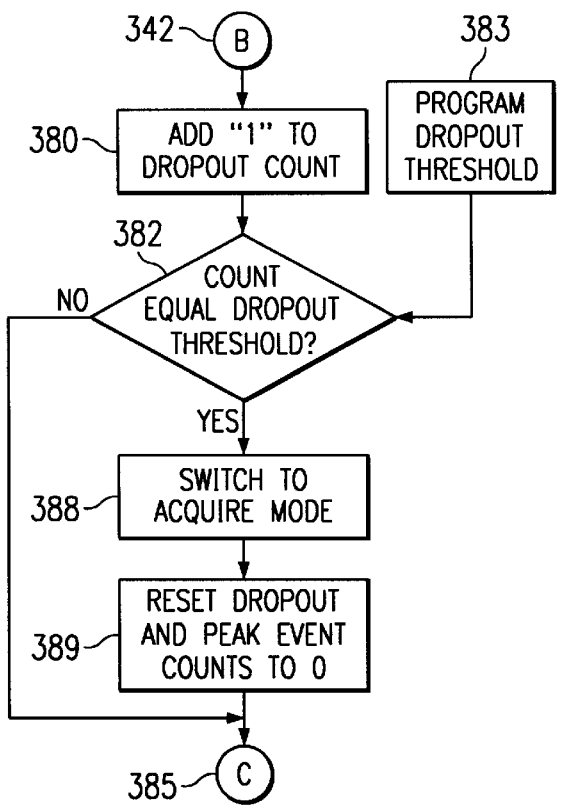
Figure 16:
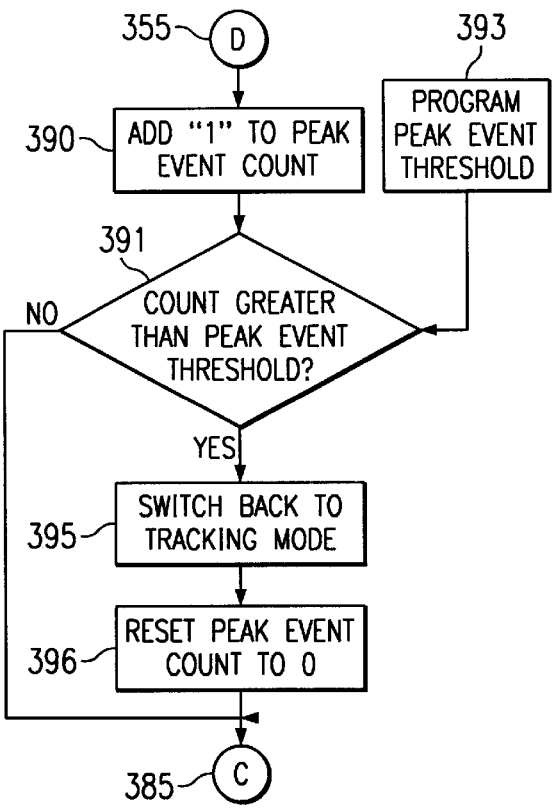
Figure 17:
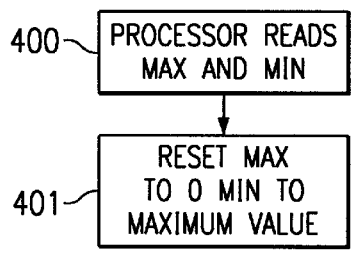
Figure 18:
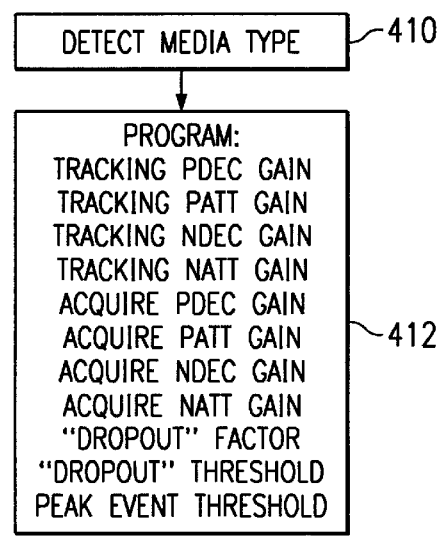

FIGS. 6A and 6B illustrate wave forms of the analog signal from the servo transducer at, respectively, positions 61 and 63 of FIG. 3. Thus, in FIG. 6A, the bursts 85 and 86 formed while the servo transducer is at position "1" of FIG. 20 from the combination of the first frequency and the second frequency burst is at a high amplitude, but the burst 87 formed from the combination of the first frequency and the null signal is at a very low amplitude because only a small portion of the servo transducer is positioned over the first frequency. Although it is easy to distinguish the bursts, it is difficult to measure the precise ratio of the bursts in the presence of noise, and therefore difficult to detect the precise position of the servo transducer.

In FIG. 6B, the bursts 90 and 91 formed while the servo transducer is at position "3" of FIG. 20 from the combination of the first frequency and the second frequency burst is at a high amplitude, as is the burst 92 formed from the combination of the first frequency and the null signal, because the servo transducer is positioned primarily over the first frequency. Thus, it is difficult to distinguish the bursts in the presence of noise, and therefore difficult to detect the precise position of the servo transducer.

Briefly, additionally referring to FIGS. 4 and 5, the parent invention digitally distinguishes the bursts and then provides the amplitudes of the envelopes of the respective bursts so that the ratio may be determined. The digital servo detector in the analog front end 65 asynchronously samples the signals read by the servo head. An envelope follower 70 receives the asynchronous digital samples, detecting and providing a maximum envelope output measuring the amplitude of a burst envelope of the maximum of the asynchronous digital samples, and detecting and providing a minimum envelope output measuring the amplitude of a burst envelope of the minimum of the asynchronous digital samples.

A "DROPOUT" threshold detector receives the asynchronous digital samples and detects the received asynchronous digital samples failing to meet a "DROPOUT" threshold related to the maximum burst envelope, providing a "DROPOUT" threshold detection signal. An "ACQUIRE" detector responds to the "DROPOUT" threshold detection to detect the minimum envelope for the envelope detector, which provides the minimum envelope output. The "DROPOUT" detection distinguishes the minimum envelope from the maximum envelope and allows measurement of the minimum envelope in minimum/maximum logic 71. Thus, a ratio of the measured maximum envelope amplitude output and the measured minimum envelope amplitude output represents the lateral position of the servo head. The specific embodiment of FIGS. 7–18 is detailed in the parent application.

Figure 21:
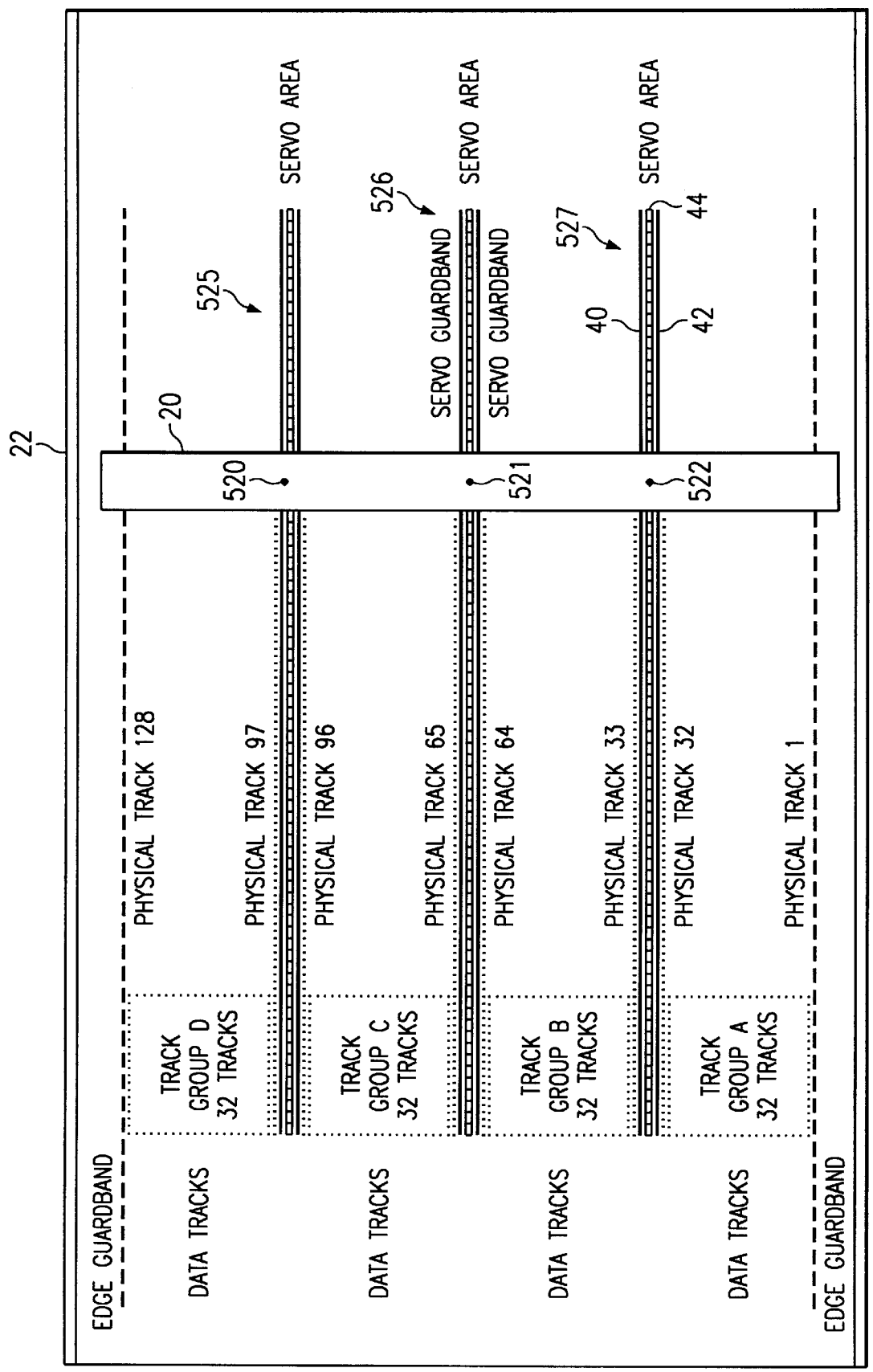
FIG. 21 is a diagrammatic illustration of a magnetic tape having 3 separate servo track areas.

Additionally, referring to FIG. 21, a plurality of servo read elements 520–522 are spaced apart in the head 20 to sense the two dissimilar signals at each corresponding edge of servo tracks 525–527. Then, the corresponding sensed two dissimilar signals of each of the servo read elements are averaged to reduce the effect of noise.

Referring to FIGS. 1, 20 and 23, logic 465 coupled, via servo decoder 28, to the servo read element, e.g. read element 505, compares the two sensed servo signals to determine the ratio therebetween. The logic then determines the error between the compared ratio of the sensed servo signals and a predetermined ratio. The predetermined ratio is the centered on-edge amplitude ratio or a predetermined offset from the centered on-edge amplitude ratio in a predetermined direction, comprising the desired and expected ratio of the sensed signals at the one of the predetermined index positions being sensed. In FIG. 20, the predetermined index positions 505–508 are all displaced from the respective edge, and in FIG. 23, index positions 602–605 are displaced and the amplitudes at an offset from the 1/2 ratio of the edge, as discussed above. The logic provides an output signal to the servo positioner 24 related to the determined error. The output signal identifies the servo position error with respect to the predetermined index position, and the servo positioner 24 moves the head 20 with servo read element 505–508 or 600–605 in a direction to reduce servo position error, thereby track following the servo index position.

Referring to FIGS. 1 and 20, the servo signals sensed at index positions 505 and 508 are identical, but the directions that the head 20 must be moved to center the servo read element with respect to the index position are reversed. Similarly, the servo signals sensed at index positions 506 and 507 are identical, but the directions that the head 20 must be moved to center the servo read element with respect to the index position are also reversed.

Referring to FIGS. 1 and 23, the servo signals sensed at the on-edge index positions 600 and 601 are identical, the servo signals sensed at index positions 602 and 605 are identical, and the servo signals sensed at index positions 603 and 604 are identical, but in each instance the directions that the head 20 must be moved to center the servo read element with respect to the index position are reversed.

Referring to FIG. 1, independent position sensor 460 is provided to provide coarse positioning information. The independent position sensor 460, in accordance with the incorporated U.S. Pat. No. 5,844,814, senses the present coarse position of the head 20 with respect to a reference, such as a fixed point adjacent the head.

In accordance with the present invention, the coarse positioning information may be at either of two alternative levels. In one embodiment, additionally referring to FIGS. 20 and 23, the independent position sensor 460 coarse positioning information indicates the edge 47 or 48 of the servo track that is presently aligned with and detected by the servo read element. The index position is then determined by the ratio between the two servo signals. Specifically, the logic 465 determines the ratio and, from the compared ratio, determines which sensed servo signal is greater. The logic responds to the greater servo signal determination, selecting the predetermined ratio as indicating the present predetermined index position in a first or in a second direction of displacement from the present edge with respect to the servo track middle servo signal.

In an alternative embodiment, the independent position sensor 460 coarse positioning information indicates the index position 505–508 of FIG. 20, or the index position 600–605 of FIG. 23, of the servo track that is presently aligned with and detected by the servo read element.

When the head 20 is to be moved to a selected index position, the index controller 26 is enabled by the control unit 12, receiving the coarse position signal from the independent position sensor 460 and transmits an appropriate signal to servo logic 465 to select the appropriate servo track, while the control unit 12 transmits an appropriate signal to a servo gap selector 32 to select the appropriate servo read element.

The logic 465 determines the present index position indication and responds to the input identified predetermined index position, first operating the positioning servo 24 in a direction from the present index position toward the input identified one of the four predetermined index positions, thereby selecting the input identified index position. The logic selects a predetermined ratio representing the selected index position. Then, the logic 465 determines the error between the compared ratio and the selected ratio, and subsequently operates the positioning servo 24 in a direction to reduce the servo position error, thereby track following the selected index position.

Figure 22:
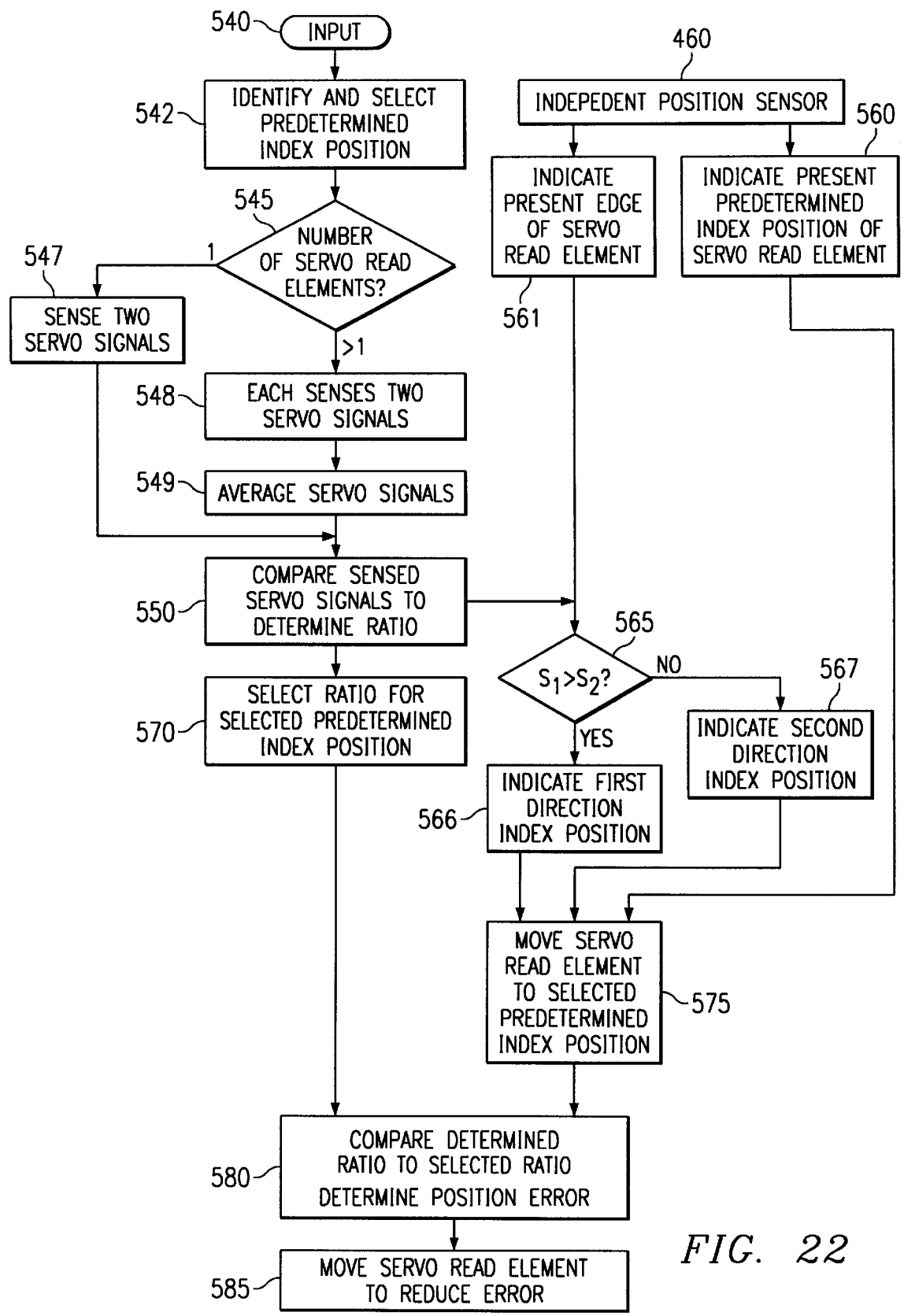
FIG. 22 is a flow chart depicting an embodiment of the method of the present invention.

An embodiment of the method of the present invention is illustrated in FIG. 22. Referring additionally to FIG. 1, the input is received from control unit 12 in step 540, and, in step 542, the servo track decoder 28 and servo logic 465 identify and select the predetermined index position. Shown as step 545, the alternatives of averaging a plurality of servo read heads or of employing a single read head are shown. The selection of the alternative will have been made based on the identification of the type of head 20 and the type of media, and step 545 represents the information associated with that identification.

If only one servo read element is employed, "1", the servo read element, in step 547, senses no more than two of the dissimilar recorded servo signals at one of the edges. The sensing step senses over a distance which is less than and substantially the entire predetermined distance between the edges. Specifically, where the displacement of an index position from one of the edges is substantially 25% of the predetermined distance separating the edges, the sensing distance of the servo read element is between substantially 80% and substantially 97% of the predetermined distance.

If more than one servo read element is employed, ">1" in step 545, the read elements each senses no more than two of the dissimilar recorded servo signals at the corresponding edges of the spaced servo tracks in step 548. Each sensed dissimilar signal for the sensing read elements is averaged in step 549. Then, in step 550, the servo decoder 28 compares either the single dissimilar servo signals from step 547 or the averaged dissimilar servo signals from step 549 to determine the ratio between the servo signals.

In the same sequence, the independent position sensor 460 independently senses the present coarse position of the head 20 servo read element with respect to a reference, the present coarse position either indicating the present predetermined index position being detected by the servo read element in step 560 or indicating the edge of the servo track middle servo signal being detected by the servo read element in step 561. Upon detection of the present edge in step 561, the ratio of two dissimilar servo signals ($S_1$) and ($S_2$) from step 550 are compared by logic 465 in step 565 to determine which of the two signals is greater. The greater of the signals ($S_1$) or ($S_2$) indicates the direction indicating the present predetermined index position in either the first direction (step 566) or in the second direction (step 567) of displacement from the indicated present edge with respect to the servo track middle servo signal.

Thus, step 560, step 566, or step 567 indicates the present predetermined index position being sensed by the servo read element. In step 570, the predetermined index position selected in step 542 is employed to select the predetermined ratio comprising a predetermined offset, if any, from the centered on-edge ratio in the selected direction. In the illustrated example of FIG. 20, the amplitude ratio representing the offset will be substantially 3/4 representing a displacement of 1/4 the predetermined distance 490 in one direction 505 or 508 away from the center signal 44, and substantially 1/4 representing a displacement of 1/4 in the other direction 506 or 507 inwardly from the edge. In the example of FIG. 23, the predetermined ratio selected in step 570 comprises substantially a 1/2 amplitude ratio for the on-edge index position 600 or 601, comprises substantially a 5/6 amplitude ratio for index positions 602 and 605 representing a displacement of 1/3 in one direction away from the center signal 44, and comprises substantially a 1/6 amplitude ratio for index positions 603 and 604 representing a displacement of 1/3 the predetermined distance 490 inwardly from the edge.

If the servo read element of head 20 is not presently positioned at the selected index position, the logic 465, in step 575, first operates the servo positioner 24 to move the servo read element to the selected index position. Steps 560, 566 or 567 are repeated until the servo read element is correctly coarsely positioned at the selected index position.

Once the servo read element is coarsely positioned at the selected index position, track following begins. In step 580, the then compared ratio of the two sensed servo signals of step 550 is compared by logic 465 to the selected ratio of step 570. The comparison determines the servo position error with respect to the selected index position. The logic 465 then operates the servo positioner 24, in step 585, to move the servo read element in a direction to reduce the servo position error.

The steps 547 or 548, and 550, 580 and 585 then continue to track follow the selected predetermined index position.

Thus, the present invention increases the track density of the data tracks of the data storage media, while utilizing the prior media servo tracks, so that the servo system may be operated to utilize the servo track positioning information as before for the prior media, and to utilize the same servo track positioning information in a more precise manner to access data tracks at a higher track density.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for detecting servo positioning with respect to a servo track, said servo track having at least two edges, each said edge comprising an interface between two dissimilar recorded servo signals, said edges on opposite lateral sides of a middle said recorded servo signal, said edges separated by a predetermined distance, said method comprising the steps of:

sensing no more than two of said dissimilar recorded servo signals at one of said edges, said sensing step sensing over a distance substantially orthogonal to said one of said edges which is no more than and is substantially the entire said predetermined distance;

comparing said two sensed servo signals to determine a ratio therebetween; and responding to said comparing step, determining an error between said compared ratio of said sensed servo signals and a predetermined ratio, said predetermined ratio comprising a predetermined offset, if any, from a centered on-edge ratio in a predetermined direction, said predetermined ratio identifying a predetermined index position substantially parallel to said one of said edges and displaced from said one of said edges, said error detecting said servo positioning with respect to said servo track predetermined index position.

2. The method of claim 1, wherein said sensing step distance additionally is greater than twice said displacement of said predetermined index position from said one of said edges.

3. The method of claim 2, wherein said sensing step distance comprises between substantially 80% and substantially 100% of said predetermined distance separating said edges.

4. The method of claim 1 for detecting said servo positioning with respect to a plurality of substantially parallel spaced said servo tracks, said spaced servo tracks spaced from each other by a distance significantly greater than said separation between said two edges of each of said servo tracks, wherein:

said sensing step additionally comprises sensing said two said dissimilar signals at each corresponding edge of said servo tracks; and said comparing step additionally comprises averaging the corresponding sensed said two dissimilar signals of each of said servo tracks for determining said ratio between said two averaged dissimilar signals.

5. The method of claim 1, additionally comprising the step of:

independently sensing the present coarse position of said sensing step with respect to a reference, said present coarse position indicating the present edge of said servo track middle servo signal being detected.

6. The method of claim 5, for detecting said servo positioning with respect to predetermined index positions of said servo track displaced respectively in a first or a second direction of displacement from said indicated present edge with respect to said middle servo signal, wherein said determining step additionally comprises the steps of:

determining from said compared ratio which said sensed servo signal is greater; and responding to said greater servo signal determination, selecting said predetermined ratio as indicating the present predetermined index position in said first or in said second direction of displacement from said indicated present edge with respect to said servo track middle servo signal.

7. The method of claim 1, for detecting said servo positioning with respect to predetermined index positions of said servo track displaced respectively in a first or a second direction of displacement from each of said edges with respect to said middle servo signal, additionally comprising the step of:

independently sensing the present coarse position of said sensing step with respect to a reference, said present coarse position indicating the present one of said predetermined index positions of said servo track being detected.

8. A method for track following a servo index position related to a servo track, said servo track having at least two edges, each said edge comprising an interface between two dissimilar recorded servo signals, said edges on opposite lateral sides of a middle said recorded servo signal, said edges separated by a predetermined distance, said servo index position substantially parallel to said one of said edges and displaced from said one of said edges, said method comprising the steps of:

sensing no more than two of said dissimilar recorded servo signals at one of said edges, said sensing step sensing over a distance substantially orthogonal to said one of said edges which is no more than and is substantially the entire said predetermined distance;

comparing said two sensed servo signals to determine a ratio therebetween;

responding to said comparing step, determining an error between said ratio of said compared sensed servo signals and a predetermined ratio, said predetermined ratio comprising a predetermined offset, if any, from a centered on-edge ratio in a predetermined direction determining a servo position error with respect to said servo index position; and operating a positioning servo in a direction to reduce said servo position error, thereby track following said servo index position.

9. The method of claim 8, for track following said servo index position with respect to a plurality of substantially parallel said servo tracks, said servo tracks separated by a distance substantially greater than said separation between said two edges of each of said servo tracks, wherein:

said sensing step additionally comprises sensing said two said dissimilar signals at each corresponding edge of said servo tracks; and said comparing step additionally comprises averaging the corresponding sensed said two dissimilar signals of each of said servo tracks to determine said ratio therebetween.

10. A method for selecting and track following.one of a plurality predetermined index positions of a servo track, in response to an input identifying said one predetermined index position, said servo track having at least two edges, each said edge comprising an interface between two dissimilar recorded servo signals, said edges substantially parallel to each other and on opposite lateral sides of a middle said recorded servo signal, said edges separated by a predetermined distance, ones of said plurality of predetermined index positions displaced respectively in a first or a second direction of displacement from each of said edges with respect to said middle servo signal, said method comprising the steps of:

sensing no more than two of said dissimilar recorded servo signals at one of said edges;

independently sensing the present coarse position of said sensing step with respect to a reference;

responding to said independent sensing step to indicate the present one of said plurality of predetermined index positions being sensed in said sensing step;

responding to said present index position indicating step and to said input identified predetermined index position, first operating a positioning servo in a direction from said indicated present index position toward said input identified one of said predetermined index positions, thereby selecting said identified one of said predetermined index positions;

responding to said sensing step, comparing said two sensed servo signals to determine a ratio therebetween;

responding to said comparing step, determining an error between said ratio of said compared sensed servo signals and a predetermined ratio, said predetermined ratio comprising a predetermined offset, if any, from a centered on-edge ratio in said predetermined direction of said selected one of said predetermined index positions, thereby determining a servo position error with respect to said selected predetermined index position; and subsequently operating said positioning servo in a direction to reduce said servo position error, thereby track following said selected predetermined index position.

11. The method of claim 10, wherein said sensing step additionally comprises:

sensing over a distance substantially orthogonal to said one of said edges which is no more than and is substantially the entire said predetermined distance.

12. The method of claim 11, wherein said sensing step distance additionally is greater than twice said displacement of said predetermined index position from said one of said edges.

13. The method of claim 12, wherein said sensing step distance comprises between substantially 80% and substantially 100% of said predetermined distance separating said edges.

14. A method for selecting and track following one of a plurality of predetermined index positions of a servo track, in response to an input identifying said one predetermined index position, said servo track having at least two edges, each said edge comprising an interface between two dissimilar recorded servo signals, said edges substantially parallel to each other and on opposite lateral sides of a middle said recorded servo signal, said edges separated by a predetermined distance, two of said plurality of predetermined index positions displaced respectively in a first or a second direction of displacement from each of said edges with respect to said middle servo signal, said method comprising the steps of:

sensing no more than two of said dissimilar recorded servo signals at one of said edges;

independently sensing the present coarse position of said sensing step with respect to a reference, said present coarse. position indicating the present edge of said middle servo signal being detected;

comparing said.two sensed servo signals to determine a ratio therebetween;

determining from said compared ratio which said sensed servo signal is greater, said determination indicating the direction of displacement of said sensing step from said indicated present edge;

responding to said independent sensing step and to said displacement direction determining step, employing said edge indication and said ratio direction determination to indicate, by said direction of displacement from said indicated present edge, the present one of said predetermined index positions being sensed in said sensing step;

responding to said present index position indication step and to said input identified predetermined index position, first operating a positioning servo in a direction from said present index position toward said input identified one of said predetermined index positions, thereby selecting said input identified one of said four predetermined index positions;

responding to said comparing step, determining an error between said ratio of said compared sensed servo signals and a predetermined ratio, said predetermined ratio comprising a predetermined offset, if any, from a centered on-edge ratio in a predetermined direction from of said selected one of said predetermined index positions, thereby determining a servo position error with respect to said selected predetermined index position; and subsequently operating said positioning servo in a direction to reduce said servo position error, thereby track following said selected predetermined index position.

15. A servo position detector for detecting servo positioning with respect to a servo track, said servo track having at least two edges, each said edge comprising an interface between two dissimilar recorded servo signals, said edges on opposite lateral sides of a middle said recorded servo signal, said edges separated by a predetermined distance, said servo position detector comprising:

a servo read element having an active sensing region extending over a distance substantially orthogonal to said one of said edges which is no more than and is substantially the entire said predetermined distance, said servo read element thereby sensing no more than two of said dissimilar recorded servo signals at one of said edges; and logic coupled to said servo read element comparing said two sensed servo signals to determine the ratio therebetween, and determining an error between said compared ratio of said sensed servo signals and a predetermined ratio, said predetermined ratio comprising a predetermined offset, if any, from a centered on-edge ratio in a predetermined direction, said predetermined ratio identifying a predetermined index position substantially parallel to said one of said edges and displaced from said one of said edges and providing an output signal related to said determined error, said output signal detecting said servo positioning with respect to said servo track predetermined index position.

16. The servo position detector of claim 15, wherein said servo read element active sensing region distance is greater than twice said displacement of said predetermined index position from said one of said edges.

17. The servo position detector of claim 16, wherein said servo read element active sensing region distance comprises between substantially 80% and substantially 100% of said predetermined distance separating said edges.

18. The servo position detector of claim 15, for detecting said servo positioning with respect to a plurality of substantially parallel spaced said servo tracks, said spaced servo tracks spaced from each other by a distance significantly greater than said separation between said two edges of each of said servo tracks, additionally comprising:

a plurality of said servo read elements spaced apart to sense said two said dissimilar signals at each corresponding edge of said servo tracks; and said logic additionally is coupled to each of said plurality of servo read elements and averages the corresponding sensed said two dissimilar signals of each of said plurality of read elements, comparing said averaged servo signals to determine the ratio therebetween, and determines an error between said compared ratio of said averaged dissimilar servo signals and said predetermined ratio.

19. The servo position detector of claim 15, additionally comprising:

an independent position sensor sensing the present coarse position of said.servo read element with respect to a reference, said present coarse position indicating the present edge of said servo track that is presently aligned with and detected by said servo read element, and wherein said logic additionally employs said coarse position to identify said present predetermined index position and to select said predetermined ratio.

20. The servo position detector of claim 19, for detecting said servo positioning with respect to predetermined index positions of said servo track displaced respectively in a first or a second direction of displacement from said indicated present edge with respect to said middle servo signal, and wherein said logic additionally determines from said compared ratio which said sensed servo is greater, and, in response to said greater servo signal determination, selects said predetermined ratio as indicating the present predetermined index position in said first or in said second direction of displacement from said indicated present edge of said servo track.

21. The servo position detector of claim 15, for detecting said servo positioning with respect to predetermined index positions of said servo track displaced respectively in a first or a second direction of displacement from each of said edges with respect to said middle servo signal;

said servo position detector additionally comprising an independent position sensor sensing the present coarse position of said servo read element with respect to a reference, said present coarse position indicating the present one of said predetermined index positions of said servo track that is aligned with and detected by said servo read element; and wherein said logic additionally employs said coarse position to identify said present predetermined index position and to select said predetermined ratio.

22. A servo track follower for detecting and following a servo index position related to a servo track, said servo track having at least two edges, each said edge comprising an interface between two dissimilar recorded servo signals, said edges on opposite lateral sides of a middle said recorded servo signal, said edges separated by a predetermined distance, said servo track follower comprising:

a servo read element having an active sensing region extending over a distance substantially orthogonal to said one of said edges which is no more than and is substantially the entire said predetermined distance, said servo read element thereby sensing no more than two of said dissimilar recorded servo signals at one of said edges;

logic coupled to said servo read element comparing said two sensed servo signals to determine the ratio therebetween, and determining an error between said compared ratio of said sensed servo signals and a predetermined ratio, said predetermined ratio comprising a predetermined offset, if any, from a centered on-edge ratio in a predetermined direction, and providing an output signal related to said determined error, said output signal identifying said servo position error with respect to a predetermined index position substantially parallel to said one of said edges and displaced from said one of said edges; and a servo positioner coupled to said logic for moving said servo read element in a direction to reduce said servo position error, thereby track following said servo index position.

23. The servo track follower of claim 22, wherein said servo read element active sensing region distance is greater than twice said displacement of said predetermined index position from said one of said edges.

24. The servo track follower of claim 23, wherein said servo read element active sensing region distance comprises between substantially 80% and substantially 100% of said predetermined distance separating said edges.

25. The servo track follower of claim 22, for detecting and following said servo index position with respect to a plurality of substantially parallel spaced said servo tracks, said spaced servo tracks spaced from each other by a distance significantly greater than said separation between said two edges of each of said servo tracks, additionally comprising:

a plurality of said servo read elements spaced apart to sense said two said dissimilar signals at each corresponding edge of said servo tracks; and wherein said logic additionally is coupled to each of said plurality of servo read elements and averages the corresponding sensed said two dissimilar signals of each of said plurality of read elements, comparing said two averaged servo signals to determine the ratio therebetween and determines an error between said compared:ratio of said averaged dissimilar servo signals and said predetermined ratio.

26. A servo track follower for selecting and following one of a plurality of predetermined index positions of a servo track, in response to an input signal identifying said one predetermined index position, said servo track having at least two edges, each said edge comprising an interface between two dissimilar recorded servo signals, said edges on opposite lateral sides of a middle said recorded servo signal, said edges separated by a predetermined distance, ones of said index positions substantially parallel to said two edges and displaced from one of said edges in, respectively, a first and a second direction, said servo track follower comprising:

an input receiving said input signal;

a servo read element having an active sensing region extending substantially orthogonal to said one of said edges to sense no more than two of said dissimilar recorded servo signals at one of said edges;

an independent position sensor sensing the present coarse position of said servo read element with respect to a reference, said present coarse position indicating the present one of said predetermined index positions of said servo track that is aligned with and detected by said servo read element;

logic coupled to said input, to said independent position sensor, and to said servo read element; said logic responding to said received input signal to determine said identified one of said plurality of predetermined index positions, selecting an edge and predetermined ratio representing said input identified predetermined index position, said predetermined ratio comprising a predetermined offset, if any, from a centered on-edge ratio in a predetermined direction; responding to said present coarse position to indicate the present one of said predetermined index positions detected by said servo read element, comparing said two sensed servo signals to determine the ratio therebetween, and determining an error, first, between (1) said present indicated predetermined index position and (2) said selected predetermined index position, and, second, between (1) said compared ratio and (2) said selected predetermined ratio, and providing an output signal related to said determined error, said output signal identifying said servo position error with respect to said input indicated predetermined index position; and a servo positioner coupled to said logic for moving said servo read element in a direction from said present index position toward said selected predetermined index position, and then to reduce said servo position error at said identified selected predetermined index position.

27. The servo track follower of claim 26, wherein said servo read element comprises an active sensing region extending over a distance in said substantially orthogonal direction which is no more than and is substantially the entire said predetermined distance separating said edges, said servo read element thereby sensing no more than two of said dissimilar recorded servo signals at one of said edges.

28. The servo track follower of claim 27, wherein said servo read element active sensing region distance is greater than twice said displacement of said predetermined index position from said one of said edges.

29. The servo track follower of claim 28, wherein said servo read element active sensing region distance comprises between substantially 80% and substantially 100% of said predetermined distance separating said edges.

30. A servo track follower for selecting and following one of a plurality of predetermined index positions of a servo track, in response to an input signal identifying said one predetermined index position, said servo track having at least two edges, each said edge comprising an interface between two dissimilar recorded servo signals, said edges on opposite lateral sides of a middle said recorded servo signal, said edges separated by a predetermined distance, ones of said index positions substantially parallel to said two edges and displaced from one of said edges in, respectively, a first and a second direction, said servo track follower comprising:

an input receiving said input signal;

a servo read element having an active sensing region extending substantially orthogonal to said one of said edges to sense no more than two of said dissimilar recorded servo signals at one of said edges;

an independent position sensor sensing the present coarse position of said servo read element with respect to a reference, said present coarse position indicating the present edge of said servo track that is aligned with and detected by said servo read element;

logic coupled to said input, to said independent position sensor, and to said servo read element; said logic responding to said received input signal to determine said identified one of said plurality of predetermined index positions, selecting an edge and predetermined ratio representing said input identified predetermined index position, said predetermined ratio comprising a predetermined offset, if any, from a centered on-edge ratio in a predetermined direction; responding to said present coarse position to indicate the present one of said edges detected by said servo read element; comparing said two sensed servo signals to determine the ratio therebetween, and determining an error, first, between (1) said indicated present edge with said compared ratio of said sensed servo signals, indicating said present index position, and (2) said selected edge with said predetermined ratio, identifying said selected predetermined index position, and, second, between (1) said compared ratio and (2) said selected predetermined ratio, and providing an output signal related to said determined error, said output signal identifying said servo position error with respect to said input identified predetermined index position; and a servo positioner coupled to said logic for moving said servo read element in a direction from said present index position toward said selected predetermined index position, and then to reduce said servo position error at said identified selected predetermined index position.

* * * * *